United States Patent
Lepeska (10) Patent No.: US 8,417,766 B2
(45) Date of Patent: Apr. 9, 2013

(54) METHODS AND SYSTEMS FOR PEER-TO-PEER APP-LEVEL PERFORMANCE ENHANCING PROTOCOL (PEP)

(75) Inventor: Peter Lepeska, Boston, MA (US)

(73) Assignee: VIASAT, Inc., Carlsbad, CA (US)

( * ) Notice: Subject to any disclaimer, the term of this patent is extended or adjusted under 35 U.S.C. 154(b) by 851 days.

(21) Appl. No.: 12/491,949

(22) Filed: Jun. 25, 2009

(65) Prior Publication Data

US 2009/0327412 A1 Dec. 31, 2009

Related U.S. Application Data

(60) Provisional application No. 61/075,536, filed on Jun. 25, 2008.

(51) Int. Cl.
*G06F 15/16* (2006.01)
(52) U.S. Cl. .......................................................... 709/203
(58) Field of Classification Search ................... 709/203, 709/204, 217, 220, 230
See application file for complete search history.

(56) References Cited

U.S. PATENT DOCUMENTS

| | | | | |
|---|---|---|---|---|
| 2005/0021398 A1* | 1/2005 | McCleskey et al. | ............ | 705/14 |
| 2007/0245010 A1* | 10/2007 | Arn et al. | ...................... | 709/223 |
| 2008/0133758 A1* | 6/2008 | Lee et al. | ...................... | 709/227 |
| 2010/0005171 A1* | 1/2010 | Arolovitch | ..................... | 709/225 |

* cited by examiner

*Primary Examiner* — Larry Donaghue
*Assistant Examiner* — Marshall McLeod
(74) *Attorney, Agent, or Firm* — Kilpatrick Townsend & Stockton LLP (57) ABSTRACT

The present invention relates to methods, apparatus, and systems for providing peer-to-peer network acceleration. The system includes content servers and clients. Each of the clients is capable of functioning as a proxy server. A client generates a request for content, and the requesting client determines which of the content servers contains the requested content. The requesting client then determines that one of the clients is in a position to retrieve the requested content on the content server at lower latency than the requesting client. The client then functions as a proxy server for the requesting client, and the requesting client receives the requested content from the client acting as a proxy server.

20 Claims, 8 Drawing Sheets

METHODS AND SYSTEMS FOR PEER-TO-PEER APP-LEVEL PERFORMANCE ENHANCING PROTOCOL (PEP)

PRIORITY CLAIM

This application claims priority to U.S. Provisional Application No. 61/075,536, entitled METHODS AND SYSTEMS FOR PEER-TO-PEER APP-LEVEL PERFORMANCE ENHANCING PROTOCOL (PEP), filed on Jun. 25, 2008, which is incorporated by reference in its entirety for any and all purposes.

FIELD OF THE INVENTION

The present invention relates, in general, to network acceleration and, more particularly, to implementing a peer-to-peer (P2P) performance enhancing protocol (PEP).

BACKGROUND

Currently, WAN optimization systems are deployed in an inline fashion at a branch location and at a data center using two servers (or appliances). Alternatively, the WAN optimization system may include a server in connection with multiple clients, in order to accelerate network traffic to each of the clients. However, there are certain drawbacks to systems implemented in such a way. Hence, improvements in the art are needed.

BRIEF SUMMARY

Embodiments of the present invention are directed to a system for providing peer-to-peer network acceleration. The system includes content servers and clients. Each of the clients is capable of functioning as a proxy server. A client generates a request for content, and the requesting client determines which of the content servers contains the requested content. The requesting client then determines that one of the clients is in a position to retrieve the requested content on the content server at lower latency than the requesting client. The client then functions as a proxy server for the requesting client, and the requesting client receives the requested content from the client acting as a proxy server.

Another embodiment is directed to a method of providing peer-to-peer network acceleration. The method includes generating, at a client system, a request for content. The client system is one of a plurality of client systems and each of the plurality of client systems is capable of functioning as a proxy server. The method further includes determining which of a plurality of content servers contains the requested content, determining that at least one of the plurality of clients is in a position to retrieve the requested content on the content server at lower latency than the requesting client, and selecting at least one of the plurality of client systems to function as a proxy server for the requesting client. Further, the method includes receiving, from the content server via the at least one of the plurality of clients functioning as a proxy server for the requesting client, the requested content.

Another embodiment is directed to a system for implementing distributed byte caching. The system includes a requesting client configured to generate a request for content, and a peer client coupled with the requesting client. The peer client is configured to store a least a portion of the requested content. The portion of the requested content is a sequence of bytes included within the requested content. The system further includes a proxy client server coupled with the peer client. The proxy server client is a client functioning as a proxy server, and the proxy client server is configured to generate a token representing the sequence of bytes within the requested content.

The system further includes a content server coupled with the proxy client server configured to transmit portions of the requested content not stored on the peer client. The proxy client server is further configured to transmit the token to the requesting client, and the requesting client is further configured to utilize the token to retrieve the at least a portion of the requested content corresponding to the token from the peer client.

In an alternative embodiment, a machine-readable medium is described. The machine-readable medium includes instructions for providing peer-to-peer network acceleration. The machine-readable medium includes instructions for generating, at a client system, a request for content. The client system is one of a plurality of client systems and each of the plurality of client systems is capable of functioning as a proxy server. The machine-readable medium further includes instructions for determining which of a plurality of content servers contains the requested content, determining that at least one of the plurality of clients is in a position to retrieve the requested content on the content server at lower latency than the requesting client, and selecting at least one of the plurality of client systems to function as a proxy server for the requesting client. Further, the machine-readable medium includes instructions for receiving, from the content server via the at least one of the plurality of clients functioning as a proxy server for the requesting client, the requested content.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

Aspects of the disclosure relate to network acceleration using peer-to-peer (P2P) networking. In P2P networking configurations, a client system within the network may desire content from a content server within the network. Often a peer client system is able to act as a proxy server for the client system requesting the content. In such a situation, the requesting client system can more efficiently retrieve the requested content from the peer client system acting as a proxy server.

Figure 1A:
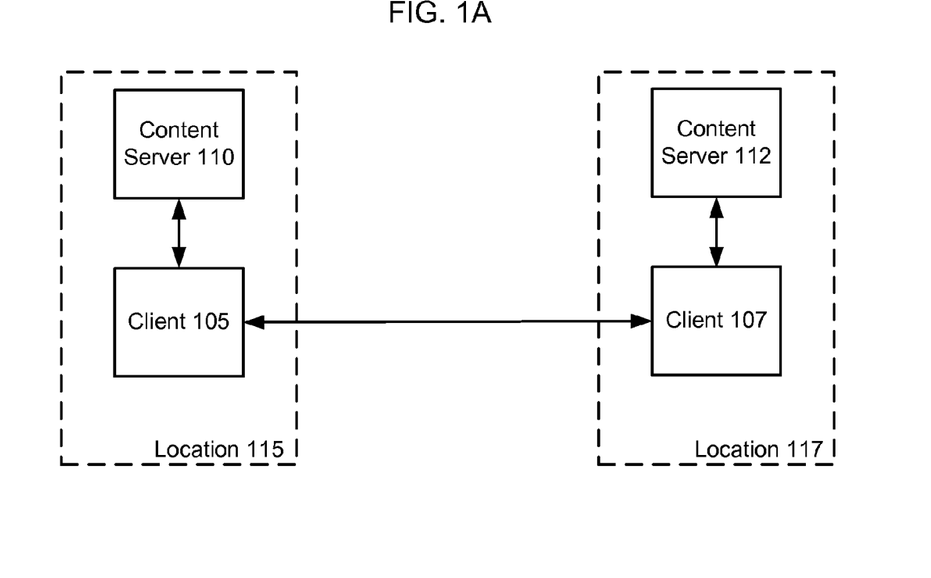
FIGS. 1A and 1B are block diagrams illustrating network acceleration within a P2P network configuration, according to embodiments of the present invention.

Turning now to FIG. 1A, which illustrates a system for implementing network acceleration within a P2P network configuration. It should be noted that the network configuration of the system is merely for exemplary purposes, and more or fewer clients, servers, etc. may be used. In one embodiment, the system may include a client 105 and a client 107. Client 105 and client 107 are peer clients interconnected in a P2P network configuration. In one embodiment, a P2P network configuration allows peer client systems (i.e., client 105 and client 107) within the P2P network to access content from other peer client systems within the P2P network. In essence, each peer client system is able to take on the operations of a server (or proxy server) for other peer client systems within the network.

In a further embodiment, client 105 and/or client 107 may be configured to function as proxy servers. Accordingly, any client within the system may act as either a client or a proxy (or acceleration) server. In other words, a P2P network acceleration/proxy server configuration may be achieved, which allows for any client within the network to act as a proxy server for any other client within the network, such that no set proxy servers are needed, which in turn allows for unconstrained network configurations, which are only limited in scope by the locations, capacity, and number of clients within the network (i.e., no need for in-line servers).

In a further embodiment, the system may include a content server 110 and a content server 112, which may be co-located with client 105 and client 107 at locations 115 and 117, respectively. In one embodiment, content servers 110 and 112 may be, for example, web servers, email servers, file transfer protocol (FTP) servers, file servers, etc. Furthermore, locations 115 and 117 may be server farms and/or data centers. Clients 105 and 107 may be coupled with content servers 110 and 112, respectively over a network transmission medium such as those described below in FIGS. 5-8. In one embodiment, the transmission medium may be a low latency or high bandwidth link. For example, the transmission medium may be a broadband link, a cable modem connection, a digital subscriber line (DSL), etc. Whereas client 105, which is remotely located from content server 112, and client 107, which is remotely located from content server 110, each would benefit from round trip reduction when accessing content from the remotely located content server. In one embodiment, the connection between the remotely located clients and content servers may be a high latency, low bandwidth link such as a satellite connection, a wireless connection, a cellular connection, etc., which would benefit from network acceleration. Therefore, when costly round trips are significantly reduced, the effective rate of transfer of the connection is greatly increased.

In other words, client 105 is functioning on the application-side, or is the client in which the application which is requesting content is operating, and client 107 and content server 112 are functioning on the content-side. Thus, in order to establish the most optimal network acceleration, client 107 retrieves the content on the content-side at the fastest rate possible, and transmits the content at the application-side to client 105 with the fewest round trips as possible.

One example of how P2P network acceleration utilizing the system's network configuration may be initiated is with client 105 generating a content request. The content request may be a file download request, a webpage content request (e.g., webpage image download, universal resource locator (URL) prefetch, a web cache request, etc.), an email send/receive, etc. In this example, assume, merely for exemplary purposes, that location 115 is in San Francisco and location 117 is in Denver. Furthermore, assume that client 105 is at or near San Francisco and that client 107 is at or near Denver.

In a further embodiment, the content included within the content request may be located at content server 112 in location 117. Typically, in order for client 105 to retrieve the content from content server 117, client 105 would need to access content server 117 through a proxy server connected with content server 117. However, in a P2P acceleration configuration, client 105 is able to determine to utilize a client (i.e., client 107) within the network as a proxy server. Accordingly, if it is determined that retrieving the content through client 107 (acting as a proxy server) is more optimal for client 105 than retrieving the content directly from content server 112, then client 105 can establish a connection with client 107 requesting client 107 to retrieve the requested content from content server 112 on behalf of client 105. Hence, because client 107 and content server 112 are co-located and are utilizing a low latency link, the chatty correspondence (communications with many round trips) between client 107 and content server 112 is negligible compared to client 105 engaging in chatty communications over the high latency link between client 105 and content server 112.

Furthermore, once client 107 (acting as a proxy server to client 105) has retrieved the content from content server 112, client 107 may then transmit the content to client 105. The transmission of the requested content from client 107 to client 105 can then be completed by a single (or minimal) transmission, which greatly reduces the number of round trips over the high latency low bandwidth link between client 105 and 107. Hence, client 105 is able to retrieve the requested content through client 107 at a faster transfer rate than retrieving the content directly from content server 112, with client 107 acting in a "proxy server" for client 105. Accordingly, client 107 and client 105 now both have the requested content, such that clients A, B, and C (not shown) at or near location 115 can retrieve the same content from client 105, and clients X, Y, and Z (not shown) at or near location 117 can similarly retrieve the same content from client 107, thus reducing round trips and overall traffic over the slow link.

In order to further illustrate the P2P acceleration described above, assume that location 115 is an on-site work location (e.g., a remote desert in the Western United States), and client 105 (and clients A, B, and C) are satellite enabled portable devices. Further, assume that location 117 is a corporate office location for the company of the on-site work location. In order for the clients at location 115 to retrieve content from the corporate office, they would need to utilize a high latency satellite link. Therefore, it would be advantageous for each client at location 115 to not duplicate their content retrieval efforts. Thus, in a P2P network acceleration configuration, each time a client at location 115 generates a content request, each of the other clients at location 115 would be examined to determine if one of the clients has a copy of the requested content. Then, the client can serve the requested content to the requesting client without unnecessarily needing to utilize the high latency satellite link.

In a further embodiment, an email message copied to all of the clients at location 115 may be transmitted. Accordingly, in this P2P acceleration configuration, the message could first be retrieved by one client over the satellite link, and then that client would distribute the email to the other client recipients, thus saving costly round trips to content server 112 over the satellite link. In an alternative embodiment, a software update release may be distributed to each of the clients at location 115. Similarly, instead of each client downloading the software update, one of the clients would download the update and then distribute it in a P2P fashion to the rest of the clients. Accordingly, the distribution of the various contents to the clients is accomplished in a "viral" manner, allowing each client to serve the content once it has been retrieved until each of the clients has the content, while limiting the number of satellite link round trips. Alternatively, if none of the clients has the content, then after one of the clients has retrieved the content from the corporate office, the other clients would then retrieve the content from the client that has already retrieved the content, thus, further reducing the use of the satellite link.

Figure 1B:
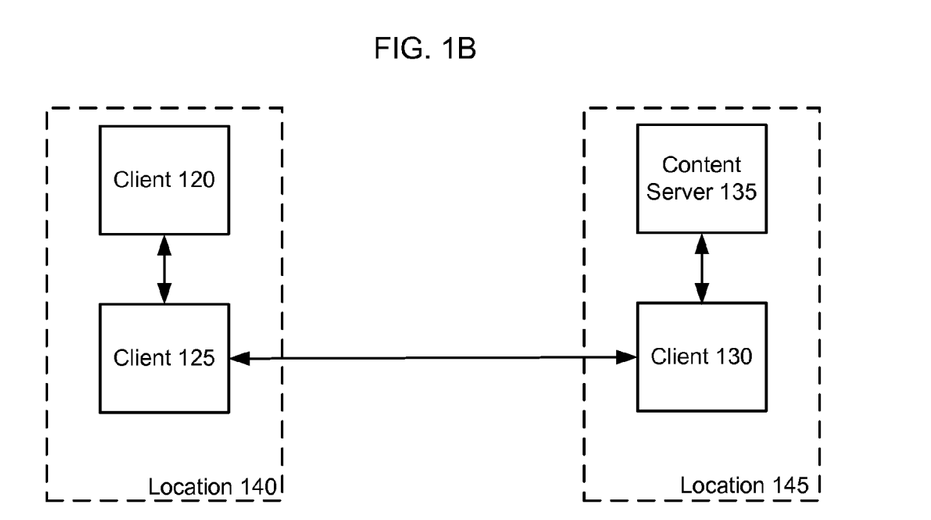

In an alternative embodiment, FIG. 1B illustrates a network for P2P distributed byte caching. In one embodiment, byte caching allows for a client to retrieve a portion of a file (or sequence of bytes within a file) from a peer client within the network. As such, a client 130 (acting as a proxy server) may receive a file request from a requesting client 120. Client 130 may identify that client 125 (a co-located peer client to client 120) has at least a portion of the requested file stored on client 125's system. Accordingly, instead of retrieving the entire file from content server 135 and transmitting the entire file to client 120, client 130 can associate a token (or other unique identifier) with the portion of the requested file stored on client 125's system. Thus, client 120 can be directed to retrieve the portion of the content from client 125 which allows for a much faster rate of transfer, fewer round trips, and low latency. Furthermore, the server sends the token to client 130 and client 130 sends it to client 125 to retrieve the portion of the file which client 125 has already downloaded.

In this example, clients 120 and 125 are functioning on the application-side and client 130 and content server 135 are functioning on the content-side. Hence, the amount of content needed to be transferred to client 120 from content server 135 over a high latency link is minimized by retrieving a portion of the sequence of bytes from client 125 which is already on the application-side. It should be noted that byte caching is different from object caching. While object caching is for an entire object and such an object can be uniquely identified by a URL, byte caching is only a portion of a file or a sequence of bytes within a file which cannot be uniquely identified by a URL. Hence, while object caching is a relatively simple undertaking, byte caching requires additional effort, as described above, to achieve.

Figure 2:
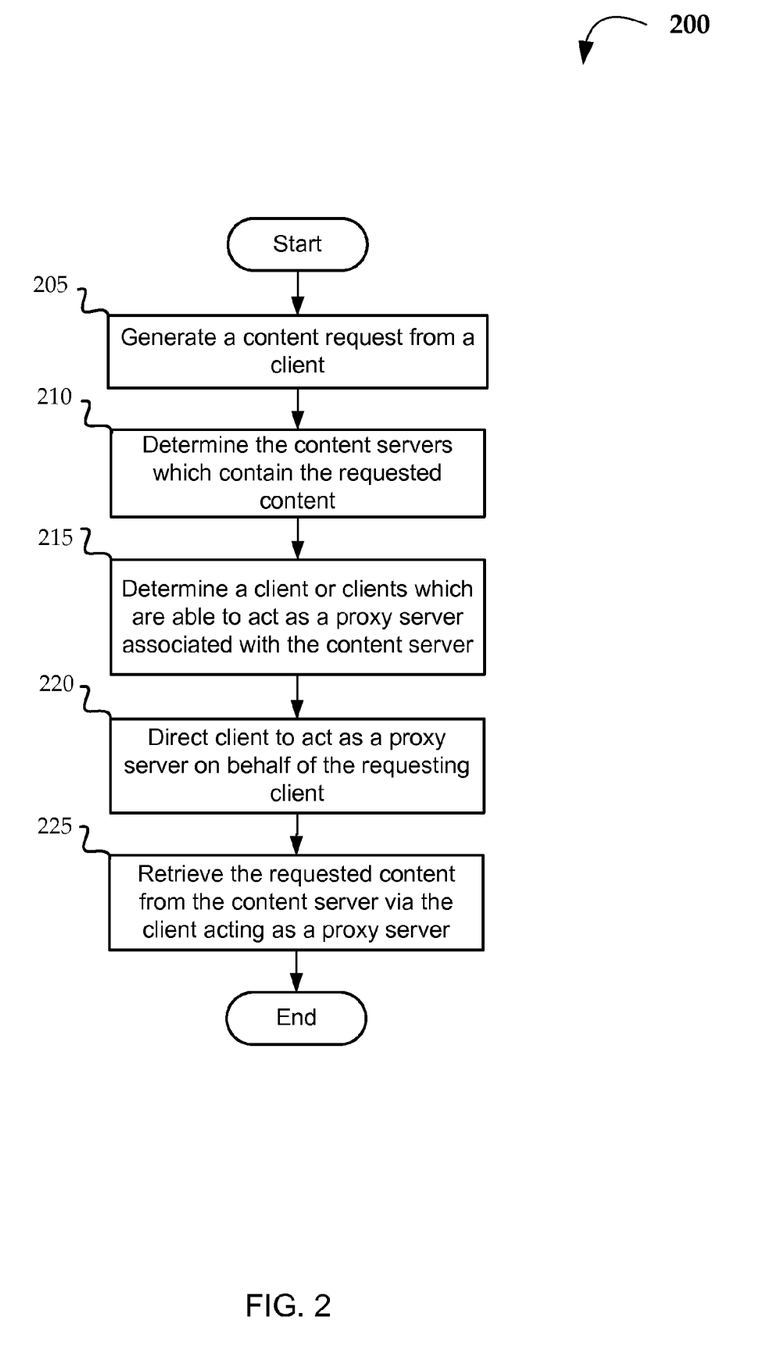
FIG. 2 is a flow diagram illustrating a method of implementing network acceleration within a P2P network configuration, according to one embodiment of the present invention.

Referring now to FIG. 2, which illustrates a method 200 of implementing network acceleration within a P2P network configuration. Some or all of the aspects of method 200 may be implemented using the network configuration of the system in FIG. 1A or a similar network configuration. At process block 205, a client generates a content request. As described above, the content may be a webpage download, an email message, a file download, a software update, etc. Furthermore, the request may be generated by the client's user clicking on a webpage URL, clicking the send button on their email client, etc., or without any user interaction (e.g., an automated system update, software update, system maintenance, etc.).

At process block 210, a determination may be made as to which content servers within the P2P network have a copy of the requested content. Furthermore, each peer client within the network which is able to act as proxy to the requesting client, may be identified (process block 215). In one embodiment, a table or the like which maintains a mapping of the associations between the content servers and the clients acting as proxy servers may be used in making the identification. Nonetheless, other methods may be used.

Accordingly, once the content servers and clients have been identified, an individual client is directed to act as proxy for the requesting client (process block 220). Hence, the selected client is configured to act as a proxy server for this content request. Alternatively, for a subsequent request the requesting client may act as a proxy server from another client, or any other client within the network may act as a proxy server. A consideration in P2P network acceleration is round trip reductions. Hence, in order to accelerate network connections, it may be best to have the majority of round trips occur over the lowest latency/highest bandwidth links within the network. In other words, the client which is acting as a proxy server is selected because of its low latency/high bandwidth connection with the content server which contains the requested content. Accordingly, acting as a proxy server, the client can retrieve the content (which requires a number of round trips) at a much faster rate than if the requesting client was attempting to retrieve the content from the content server over the high latency/low bandwidth link (process block 225). Furthermore, the proxy server client can then transmit the content to the requesting client with fewer (or even a single) round trip(s), thus greatly improving the rate of transfer for the requesting client.

Figure 3:
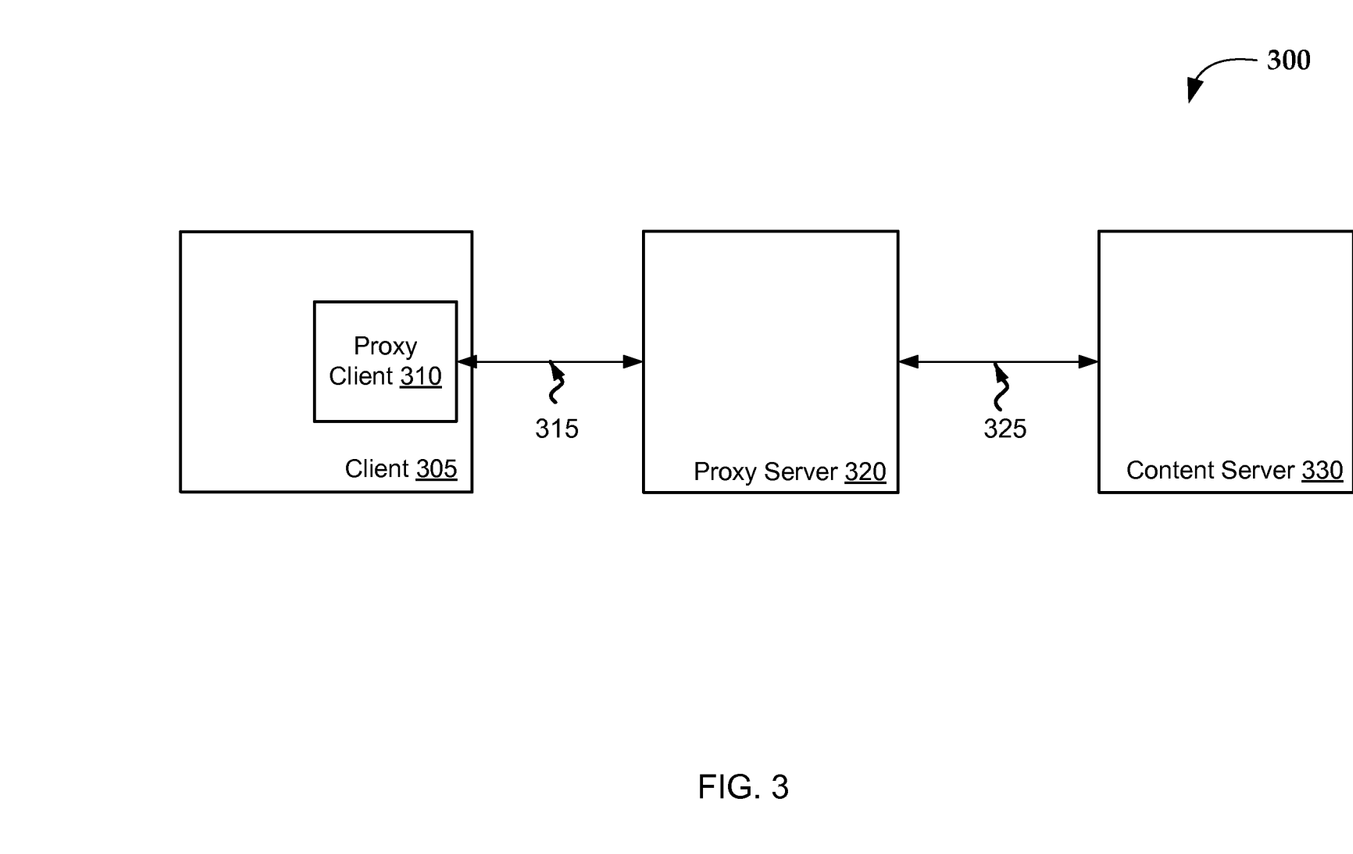
FIG. 3 is a block diagram illustrating a system for implementing network acceleration within a P2P network configuration, according to one embodiment of the present invention.

Referring now to FIG. 3, which illustrates a system 300 for implementing network acceleration. In one embodiment, system 300 may include a client 305 with a proxy client 310. Client 305 may be client 105 or 107 (FIG. 1) or any of the other client systems described in FIGS. 1 and/or 2. System 300 may further include a proxy server 320 (i.e., a client acting as a proxy server) connected with a client system over a high latency link 315. High latency link 315 may be a satellite link, a wireless link, and cellular link, etc. In one embodiment, proxy server 320 may be either proxy server 110 or 112 (FIG. 1) or any of the other proxy (i.e., acceleration) servers described in FIGS. 1 and/or 2.

In a further embodiment, system 300 may include a content server 330 connected to proxy server 320 via a low latency link 325. Low latency link 325 may be a T1 line, a cable modem, a digital subscriber line (DSL), a fiber optic line, etc. In one embodiment, content server 330 may be content server 115 or 117 (FIG. 1) or any of the other content servers described in FIGS. 1 and/or 2. Furthermore, content server 330 may be a web server, a file server, a mail server, a hypertext transfer protocol (HTTP) server, a server message block (SMB) server, etc. Accordingly, system 300 may be used to implement any portion of the P2P network acceleration configuration described above. Further, system 300 may be utilized to implement the examples described above and/or method 200 described in FIG. 2.

Figure 4:
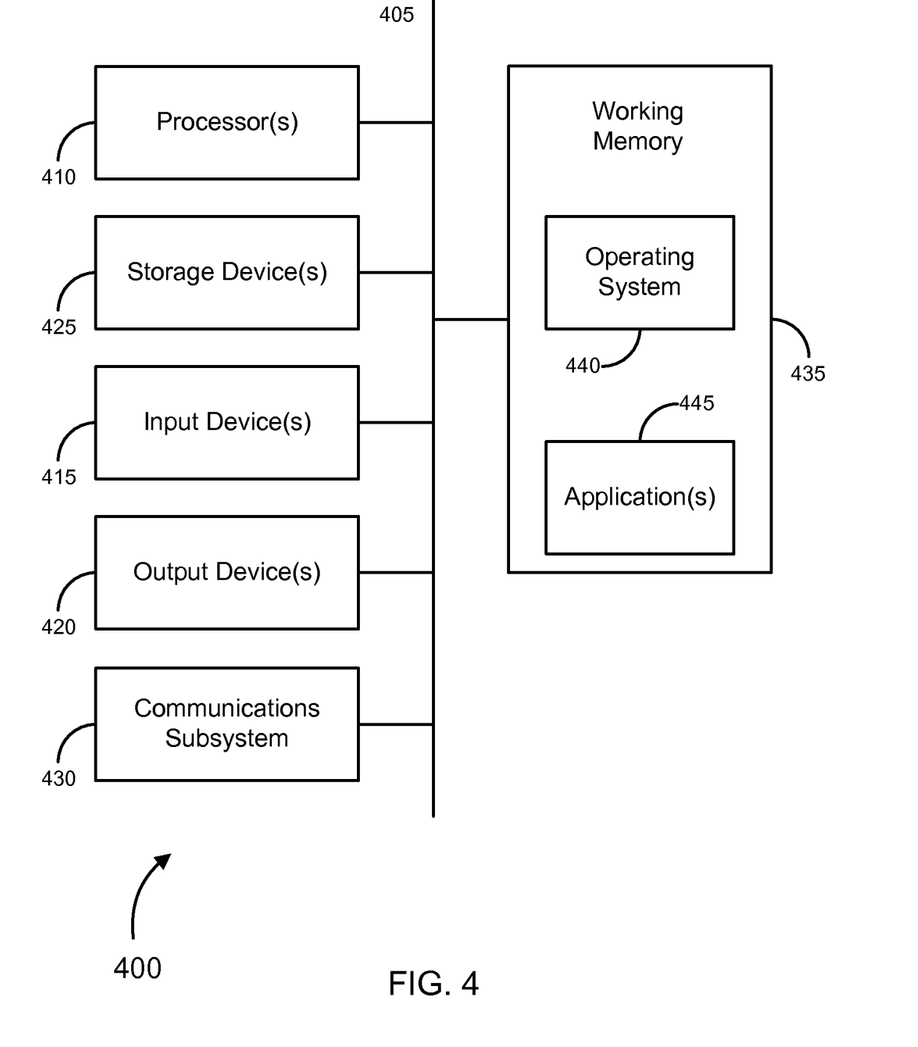
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein, and/or can function, for example, as any part of client 305, content server 330, etc. of FIG. 3. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation, dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation, radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
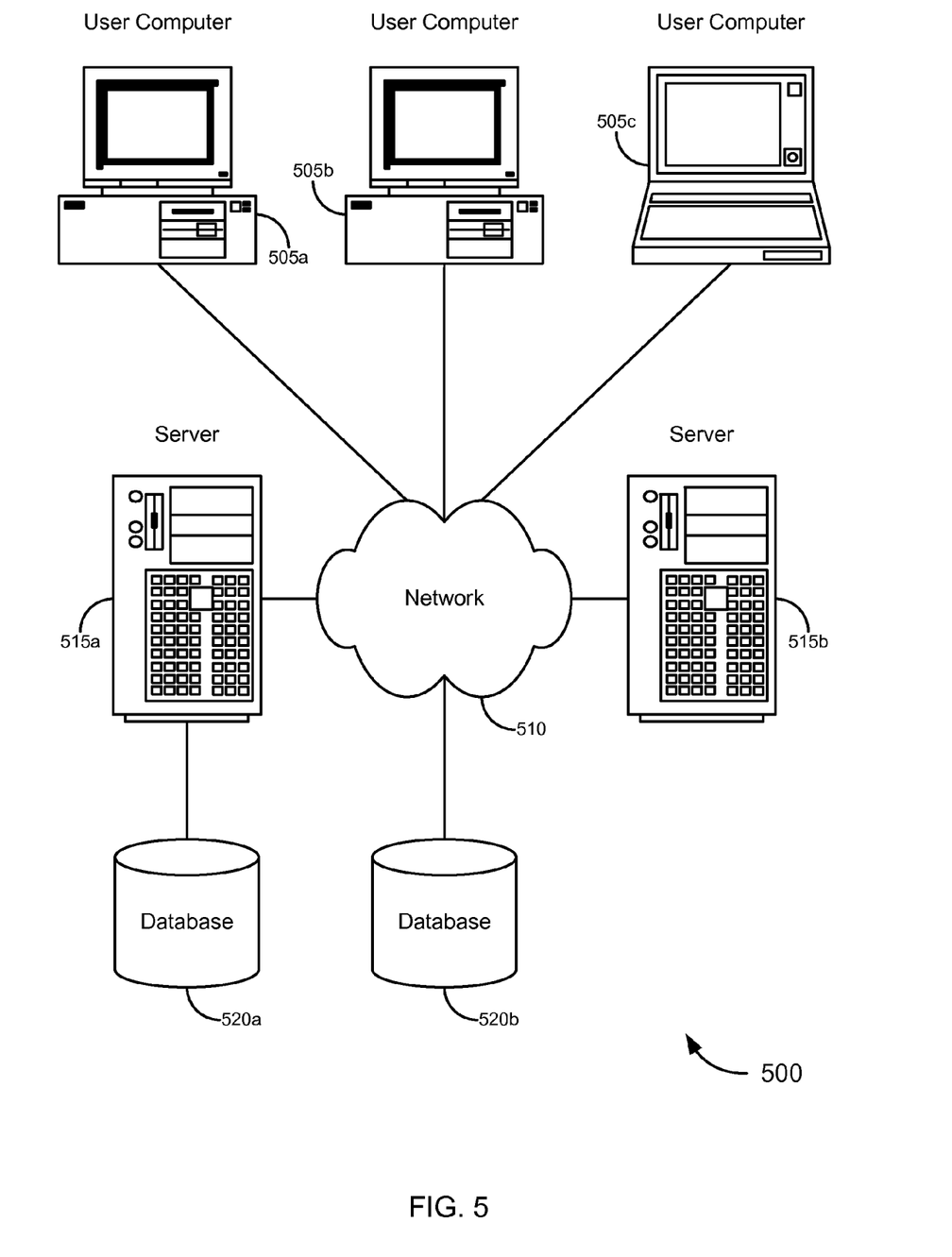
FIG. 5 is a block diagram illustrating a networked system of computers, which can be used in accordance with various embodiments of the invention.

A set of embodiments comprises systems for dynamic routing. In one embodiment, proxy server 320, content server 330, etc. of FIG. 3, may be implemented as computer system 400 in FIG. 4. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant (PDA), capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 505 to perform methods of the invention.

The server computers 515, in some embodiments, might include one or more application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 505 and/or another server 515. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as the database can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, that is adapted to store, update, and retrieve data in response to SQL-formatted commands. The database might be controlled and/or maintained by a database server, as described above, for example.

Figure 6:
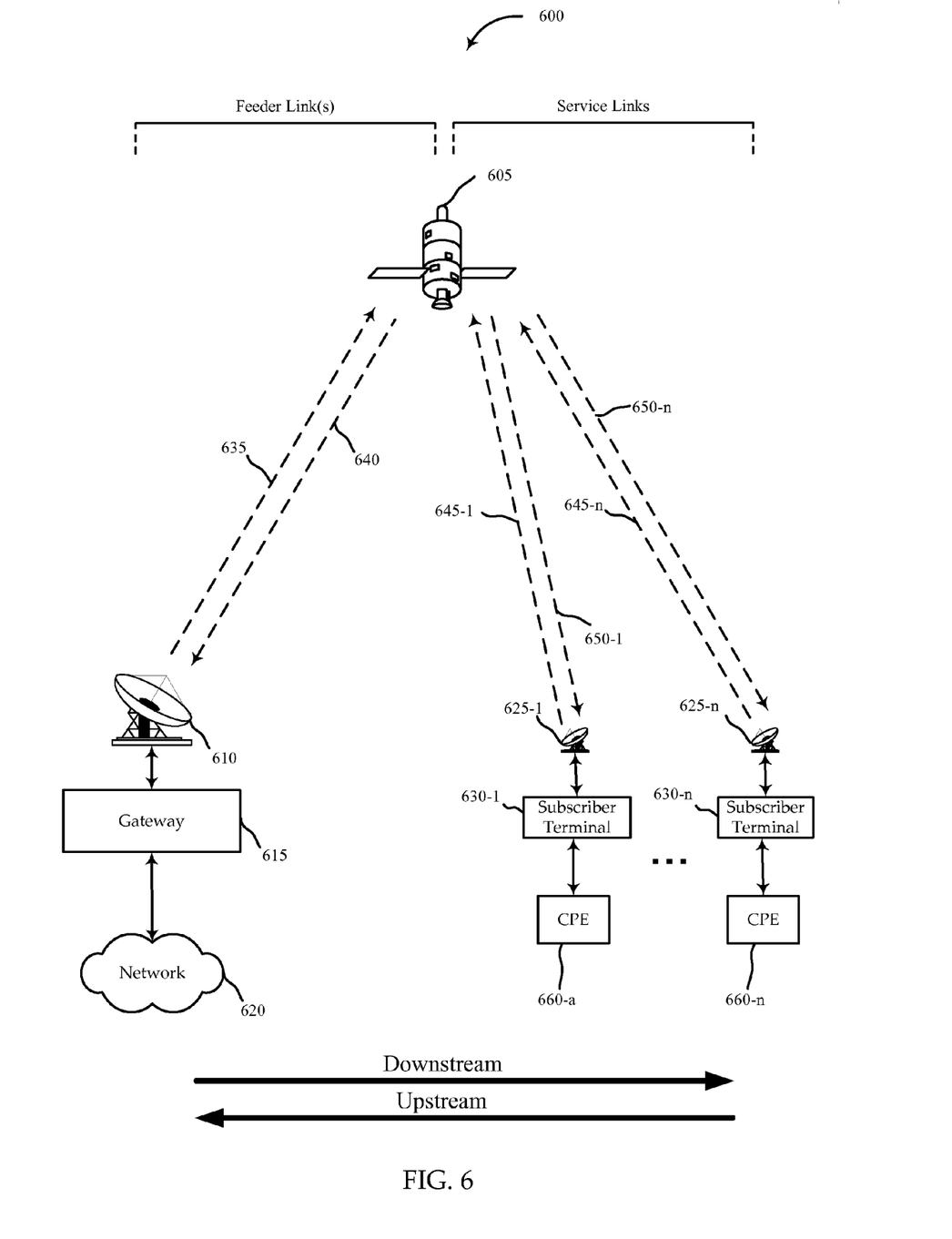
FIG. 6 is a block diagram illustrating a satellite communications system, which can be used in accordance with various embodiments of the invention.

Referring first to FIG. 6, a module diagram is shown of a satellite communications system 600 for use with various embodiments of the invention. The satellite communications system 600 includes a network 620, such as the Internet, interfaced with a gateway 615 that is configured to communicate with one or more subscriber terminals 630, via a satellite 605. A gateway 615 is sometimes referred to as a hub or ground station. Subscriber terminals 630 are sometimes called modems, satellite modems, or user terminals. As noted above, although the communications system 600 is illustrated as a geostationary satellite 605 based communication system, it should be noted that various embodiments described herein are not limited to use in geostationary satellite-based systems; for example, some embodiments could be low earth orbit ("LEO") satellite-based systems or aerial payloads not in orbit and held aloft by planes, blimps, weather balloons, etc. Other embodiments could have a number of satellites instead of just one.

The network 620 may be any type of network and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network supporting data communication between devices described herein, in different embodiments. A network 620 may include both wired and wireless connections, including optical links. As illustrated in a number of embodiments, the network 620 may connect the gateway 615 with other gateways (not shown), which are also in communication with the satellite 605.

The gateway 615 provides an interface between the network 620 and the satellite 605. The gateway 615 may be configured to receive data and information directed to one or more subscriber terminals 630, and can format the data and information for delivery to the respective destination device via the satellite 605. Similarly, the gateway 615 may be configured to receive signals from the satellite 605 (e.g., from one or more subscriber terminals 630) directed to a destination in the network 620, and can process the received signals for transmission along the network 620.

A device (not shown) connected to the network 620 may communicate with one or more subscriber terminals 630. Data and information, for example IP datagrams, may be sent from a device in the network 620 to the gateway 615. It will be appreciated that the network 620 may be in further communication with a number of different types of providers, including content providers, application providers, service providers, etc. Further, in various embodiments, the providers may communicate content with the satellite communication system 600 through the network 620, or through other components of the system (e.g., directly through the gateway 615).

The gateway 615 may format frames in accordance with a physical layer definition for transmission to the satellite 605. A variety of physical layer transmission modulation and coding techniques may be used with certain embodiments of the invention, including those defined with the DVB-S2 standard. The link 635 from the gateway 615 to the satellite 605 may be referred to hereinafter as the downstream uplink 635. The gateway 615 uses the antenna 610 to transmit the content (e.g., via signals) to the satellite 605. In one embodiment, the antenna 610 comprises a parabolic reflector with high directivity in the direction of the satellite and low directivity in other directions. The antenna 610 may comprise a variety of alternative configurations and include operating features such as high isolation between orthogonal polarizations, high efficiency in the operational frequency bands, and low noise.

In one embodiment, a geostationary satellite 605 is configured to receive the signals from the location of antenna 610 and within the frequency band and specific polarization transmitted. The satellite 605 may, for example, use a reflector antenna, lens antenna, array antenna, active antenna, or other mechanism known in the art for reception of such signals. The satellite 605 may process the signals received from the gateway 615 and forward the signal from the gateway 615 containing the MAC frame to one or more subscriber terminals 630. In one embodiment, the satellite 605 operates in a multi-beam mode, transmitting a number of narrow beams, each directed at a different region of the earth, allowing for frequency re-use with a multicolor beam pattern.

With such a multibeam satellite 605, there may be any number of different signal switching configurations on the satellite 605, allowing signals from a single gateway 615 to be switched between different spot beams. In one embodiment, the satellite 605 may be configured as a "bent pipe" satellite, wherein the satellite may frequency-convert the received carrier signals before retransmitting these signals to their destination, but otherwise perform little or no other processing on the contents of the signals. There could be a single carrier signal for each service spot beam or multiple carriers in different embodiments. Similarly, single or multiple carrier signals could be used for the feeder spot beams. A variety of physical layer transmission modulation and coding techniques may be used by the satellite 605 in accordance with certain embodiments of the invention, including those defined with the DVB-S2 standard. For other embodiments, a number of configurations are possible (e.g., using LEO satellites, or using a mesh network instead of a star network), as will be evident to those skilled in the art.

The service signals transmitted from the satellite 605 may be received by one or more subscriber terminals 630, via the respective subscriber antenna 625. In one embodiment, the subscriber antenna 625 and terminal 630 together comprise a very small aperture terminal ("VSAT"), with the antenna 625 measuring approximately 0.6 meters in diameter and having approximately 2 watts of power. In other embodiments, a variety of other types of subscriber antennae 625 may be used at the subscriber terminal 630 to receive the signal from the satellite 605. The link 650 from the satellite 605 to the subscriber terminals 630 may be referred to hereinafter as the downstream downlink 650. Each of the subscriber terminals 630 may comprise a single user terminal or, alternatively, comprise a hub or router (not pictured) that is coupled to multiple user terminals.

In some embodiments, some or all of the subscriber terminals 630 are connected to consumer premises equipment ("CPE") 660. CPE may include, for example, computers, local area networks, Internet appliances, wireless networks, etc. A subscriber terminal 630, for example 630-a, may transmit data and information to a network 620 destination via the satellite 605. The subscriber terminal 630 transmits the signals via the upstream uplink 645-a to the satellite 605 using the subscriber antenna 625-a. The link from the satellite 605 to the gateway 615 may be referred to hereinafter as the upstream downlink 640.

In various embodiments, one or more of the satellite links (e.g., 635, 640, 645, and/or 650) are capable of communicating using one or more communication schemes. In various embodiments, the communication schemes may be the same or different for different links. The communication schemes may include different types of coding and modulation schemes. For example, various satellite links may communicate using physical layer transmission modulation and coding techniques, adaptive coding and modulation schemes, etc. The communication schemes may also use one or more different types of multiplexing schemes, including Multi-Frequency Time-Division Multiple Access ("MF-TDMA"), Time Division Multiple Access ("TDMA"), Frequency Division Multiple Access ("FDMA"), Orthogonal Frequency Division Multiple Access ("OFDMA"), Code Division Multiple Access ("CDMA"), or any number of hybrid or other schemes known in the art.

In a given satellite spot beam, all customers serviced by the spot beam may be capable of receiving all the content traversing the spot beam by virtue of the fact that the satellite communications system 600 employs wireless communications via various antennae (e.g., 610 and 625). However, some of the content may not be intended for receipt by certain customers. As such, the satellite communications system 600 may use various techniques to "direct" content to a subscriber or group of subscribers. For example, the content may be tagged (e.g., using packet header information according to a transmission protocol) with a certain destination identifier (e.g., an IP address) or use different modcode points. Each subscriber terminal 630 may then be adapted to handle the received data according to the tags. For example, content destined for a particular subscriber terminal 630 may be passed on to its respective CPE 660, while content not destined for the subscriber terminal 630 may be ignored. In some cases, the subscriber terminal 630 caches information not destined for the associated CPE 660 for use if the information is later found to be useful in avoiding traffic over the satellite link.

Figure 7:
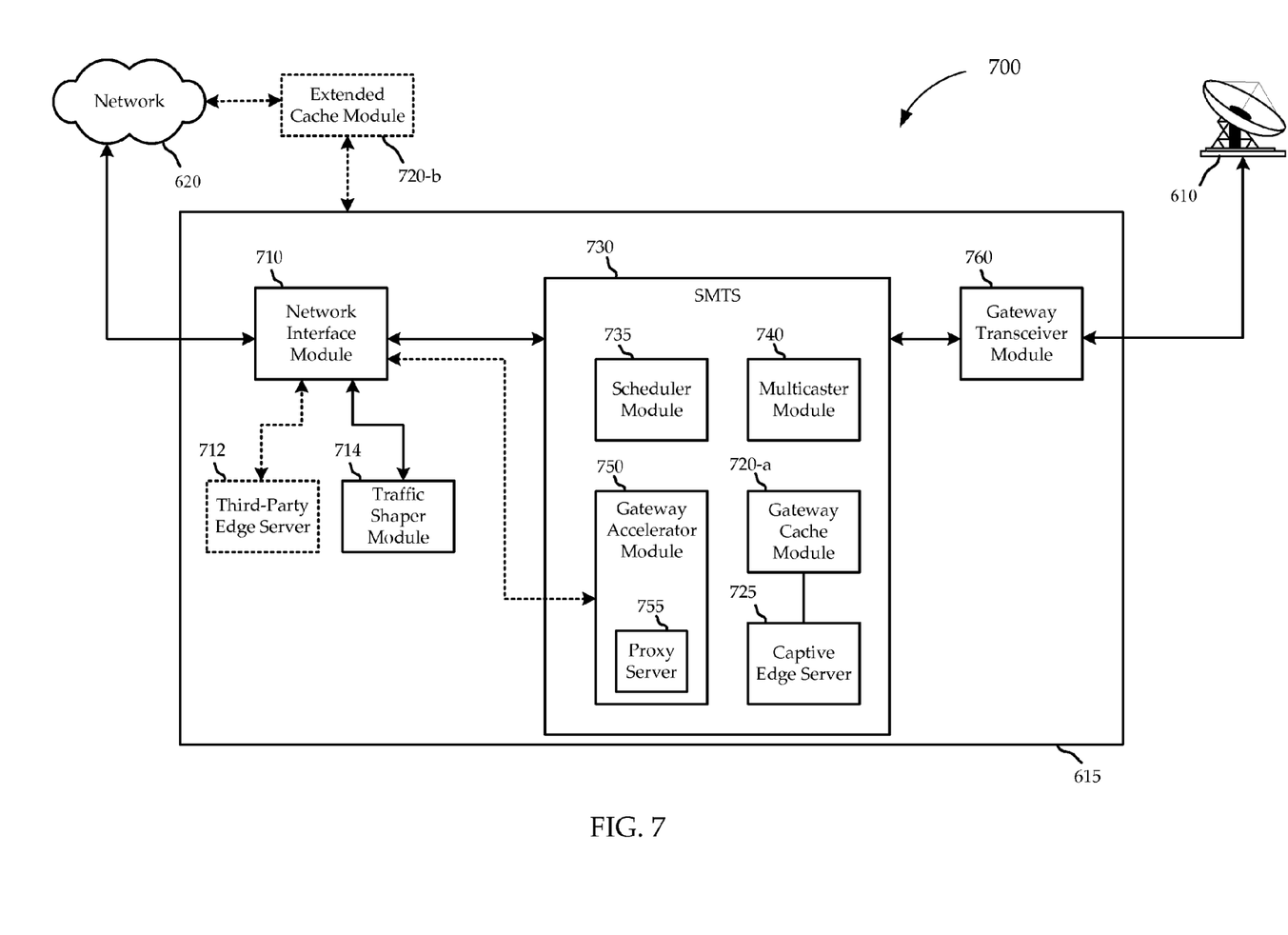
FIG. 7 is a block diagram illustrating a satellite gateway, which can be used in accordance with various embodiments of the invention.

It will be appreciated that many embodiments of gateways are possible for use in embodiments of communication systems, like the satellite communication system 600 of FIG. 6. FIG. 7 shows a simplified block diagram 700 illustrating an embodiment of a gateway 615 coupled between the network 620 and an antenna 610, according to various embodiments of the invention. The gateway 615 has a number of components, including a network interface module 710, a satellite modem termination system ("SMTS") 730, and a gateway transceiver module 760.

Components of the gateway 615 may be implemented, in whole or in part, in hardware. Thus, they may comprise one, or more, Application Specific Integrated Circuits ("ASICs") adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays ("FPGAs") and other Semi-Custom ICs), which may be programmed in any manner known in the art. Each may also be implemented, in whole or in part, with instructions embodied in a computer-readable medium, formatted to be executed by one or more general or application specific controllers.

Embodiments of the gateway 615 receive data from the network 620 (e.g., the network 620 of FIG. 6), including data destined for one or more subscribers in a spot beam. The data is received at the network interface module 710, which includes one or more components for interfacing with the network 620. For example, the network interface module 710 includes a network switch and a router.

In some embodiments, the network interface module 710 interfaces with other modules, including a third-party edge server 712 and/or a traffic shaper module 714. The third-party edge server 712 may be adapted to mirror content (e.g., implementing transparent mirroring, like would be performed in a point of presence ("POP") of a content delivery network ("CDN")) to the gateway 615. For example, the third-party edge server 712 may facilitate contractual relationships between content providers and service providers to move content closer to subscribers in the satellite communication network 600. The traffic shaper module 714 controls traffic from the network 620 through the gateway 615, for example, to help optimize performance of the satellite communication system 600 (e.g., by reducing latency, increasing effective bandwidth, etc.). In one embodiment, the traffic shaper module 714 delays packets in a traffic stream to conform to a predetermined traffic profile.

Traffic is passed from the network interface module 710 to the SMTS 730 to be handled by one or more of its component modules. In some embodiments, the SMTS 730 includes a scheduler module 735, a multicaster module 740, a gateway accelerator module 750, a gateway cache module 720-$a$, and/or a captive edge server 725. Embodiments of the scheduler module 735 are configured to provide various functions relating to scheduling the links of the satellite communication system 600 handled by the gateway 615. For example, the scheduler module 735 may manage link bandwidth by scheduling license grants within a spot beam. Embodiments of the multicaster module 740 are configured to provide various functions relating to multicasting of data over the links of the satellite communication system 600. For example, the multicaster module 740 may determine whether data is unicast or multicast to one or more subscribers. In some embodiments, the multicaster module 740 and/or scheduler module 735 contribute to determinations of what modcodes to use, whether data should or should not be sent as a function of data cached at destination subscriber terminals 630, how to handle certain types of encryption, etc.

Embodiments of the gateway accelerator module 750 provide various types of application, WAN/LAN, and/or other acceleration functionality. In one embodiment, the gateway accelerator module 750 implements functionality of AcceleNet applications from Intelligent Compression Technologies, Inc. ("ICT"), a division of ViaSat, Inc. This functionality may be used to exploit information from application layers of the protocol stack (e.g., layers 4-7 of the IP stack) through use of software or firmware operating in the subscriber terminal 630 and/or CPE 660.

In some embodiments, the gateway accelerator module 750 is adapted to provide high payload compression. For example, the gateway accelerator module 750 may compress payload such that over 75% of upload traffic when browsing the web is being used by transport management, rather than payload data. In other embodiments, functionality of the gateway accelerator module 750 is closely integrated with the satellite link through components of the SMTS 730 to reduce upload bandwidth requirements and/or to more efficiently schedule to satellite link (e.g., by communicating with the scheduler module 735). For example, the link layer may be used to determine whether packets are successfully delivered, and those packets can be tied more closely with the content they supported through application layer information. In certain embodiments, these and/or other functions of the gateway accelerator module 750 are provided by a proxy server 755 resident on (e.g., or in communication with) the gateway accelerator module 750.

In some embodiments, functionality of the SMTS 730 is provided through the gateway cache module 720. Embodiments of the gateway cache module 720 include any useful type of memory store for various types of functionality of the gateway 615. For example, the gateway cache module 720 may include volatile or non-volatile storage, servers, files, queues, etc. Further, in certain embodiments, storage functionality and/or capacity is shared between an integrated (e.g., on-board) gateway cache module 720-*a* and an extended (e.g., off-board) cache module 720-*b*. For example, the extended cache module 720-*b* may be accessible by the gateway 615 via the network 620.

In certain embodiments, the gateway cache module 720 is in communication with the captive edge server 725. In some embodiments, the captive edge server 725 provides functionality similar to that of the third-party edge server 712, including content mirroring. For example, the captive edge server 725 may facilitate different contractual relationships from those of the third-party edge server 712 (e.g., between the gateway 615 provider and various content providers).

It will be appreciated that the SMTS 730 may provide many different types of functionality. For example, embodiments of the SMTS 730 oversee a variety of decoding, interleaving, decryption, and unscrambling techniques. The SMTS 730 may also manage functions applicable to the communication of content downstream through the satellite 605 to one or more subscriber terminals 630. In certain embodiments, some or all of these downstream communication functions are handled by the gateway transceiver module 760.

Embodiments of the gateway transceiver module 760 encode and/or modulate data, using one or more error correction techniques, adaptive encoding techniques, baseband encapsulation, frame creation, etc. (e.g., using various modcodes, lookup tables, etc.). Other functions may also be performed by these components (e.g., by the SMTS 730), including upconverting, amplifying, filtering, tuning, tracking, etc. The gateway transceiver module 760 communicates data to one or more antennae 610 for transmission via the satellite 605 to the subscriber terminals 630.

Figure 8:
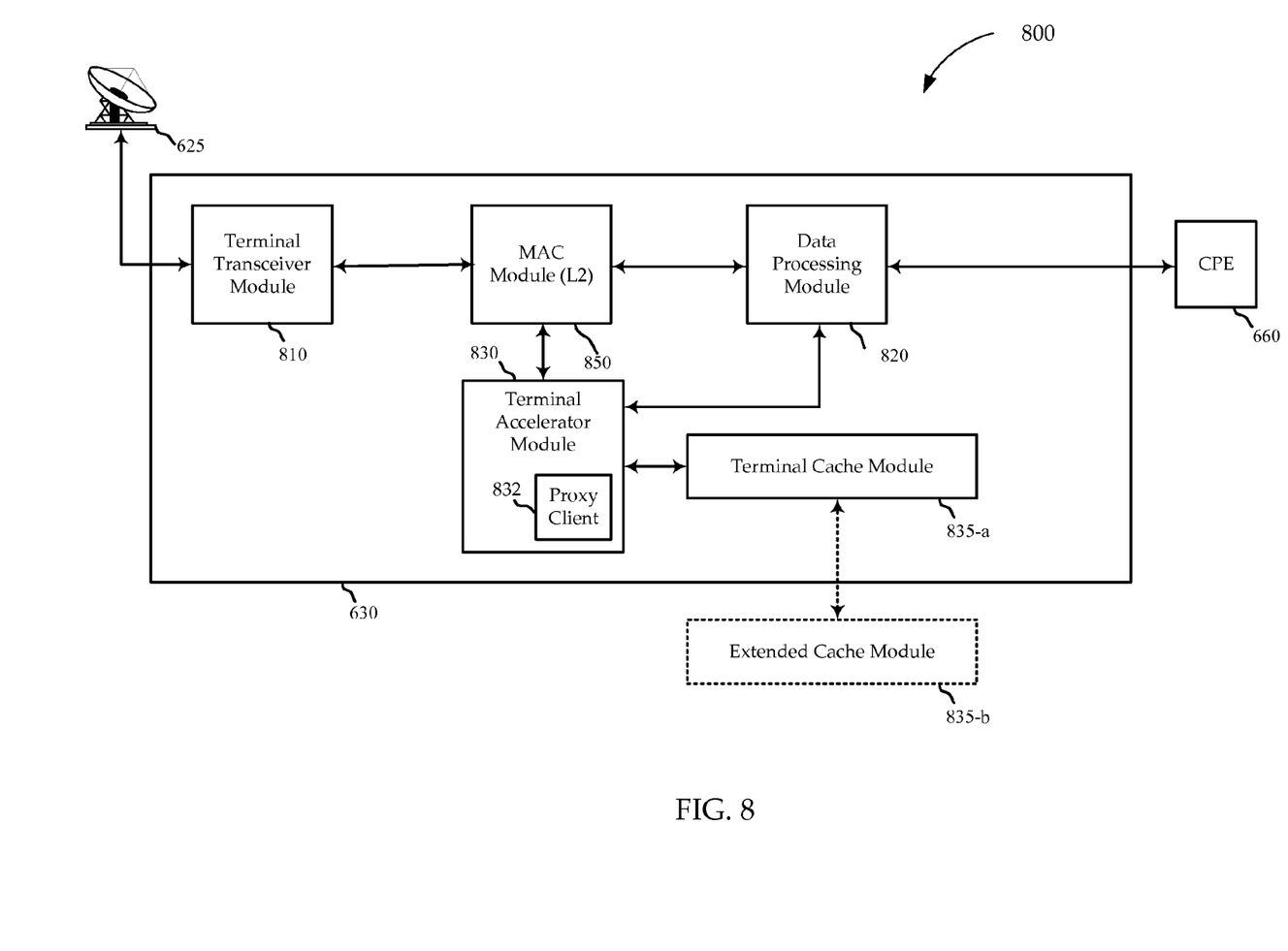
FIG. 8 is a block diagram illustrating multiple satellite subscriber terminals, which can be used in accordance with various embodiments of the invention.

FIG. 8 shows a simplified block diagram 800 illustrating an embodiment of a subscriber terminal 630 coupled between the respective subscriber antenna 625 and the CPE 660, according to various embodiments of the invention. The subscriber terminal 630 includes a terminal transceiver module 810, a data processing module 820, a terminal accelerator module 830, a terminal cache module 835, and a MAC module 850. The components may be implemented, in whole or in part, in hardware. Thus, they may comprise one, or more, Application Specific Integrated Circuits ("ASICs") adapted to perform a subset of the applicable functions in hardware. Alternatively, the functions may be performed by one or more other processing modules (or cores), on one or more integrated circuits. In other embodiments, other types of integrated circuits may be used (e.g., Structured/Platform ASICs, Field Programmable Gate Arrays ("FPGAs") and other Semi-Custom ICs), which may be programmed in any manner known in the art. Each may also be implemented, in whole or in part, with instructions embodied in a computer-readable medium, formatted to be executed by one or more general or application specific processors.

A signal from the subscriber antenna 625 is received by the subscriber terminal 630 at the terminal transceiver module 810. Embodiments of the terminal transceiver module 810 may amplify the signal, acquire the carrier, and/or downconvert the signal. In some embodiments, this functionality is performed by other components (either inside or outside the subscriber terminal 630). The downconverted signal is communicated to the data processing module 820 to be digitized and further processed.

Embodiments of the data processing module 820 provide various types of data processing functionality. For example, the data processing module 820 processes the received signal by interpreting (e.g., and decoding) modulation and/or coding schemes, interpreting multiplexed data streams, filtering the digitized signal, parsing the digitized signal into various types of information (e.g., by extracting the physical layer header), etc.

In some embodiments, the data processing module 820 is in communication with the terminal accelerator module 830. In some embodiments, the terminal accelerator module 830 provides substantially the same functionality as the gateway accelerator module 750, including various types of applications, WAN/LAN, and/or other acceleration functionality. In one embodiment, the terminal accelerator module 830 implements functionality of AcceleNet applications, like interpreting data communicated by the gateway 615 using high payload compression, handling various prefetching functions, parsing scripts to interpret requests, etc. In certain embodiments, these and/or other functions of the terminal accelerator module 830 are provided by a proxy client 832 resident on (e.g., or in communication with) the terminal accelerator module 830.

In some embodiments, output from the data processing module 820 and/or the terminal accelerator module 830 is stored in the terminal cache module 835. Further, the data processing module 820 and/or the terminal accelerator module 830 may be configured to determine what data should be stored in the terminal cache module 835 and which data should not (e.g., which data should be passed to the CPE 660). It will be appreciated that the terminal cache module 835 may include any useful type of memory store for various types of functionality of the subscriber terminal 630. For example, the terminal cache module 835 may include volatile or non-volatile storage, servers, files, queues, etc.

In certain embodiments, storage functionality and/or capacity is shared between an integrated (e.g., on-board) terminal cache module 835-*a* and an extended (e.g., off-board) cache module 835-*b*. For example, the extended cache module 835-*b* may be implemented in various ways, including as an attached peripheral device (e.g., a thumb drive, USB hard drive, etc.), a wireless peripheral device (e.g., a wireless hard drive), a networked peripheral device (e.g., a networked server), etc. In one embodiment, functionality of the terminal cache module 835 is implemented as storage integrated in the CPE 660 of FIG. 6.

Data destined for the CPE 660 (e.g., data not stored in the terminal cache module 835 or data retrieved from the terminal cache module 835) is communicated to the MAC module 850. Embodiments of the MAC module 850 prepare data for communication to the CPE 660. For example, the MAC module 850 may modulate, encode, filter, decrypt, and/or otherwise process the data to be compatible with the CPE 660.

In certain embodiments, the subscriber terminal 630 is configured to transmit data back to the gateway 615. Embodiments of the terminal transceiver module 810, the data processing module 820, the terminal accelerator module 830, the terminal cache module 835, and/or the MAC module 850 are configured to provide functionality for communicating information back through the satellite communication system 600 (e.g., for directing provision of services). For example, information about what is stored in the terminal cache module 835 may be sent back to the gateway 615 for limiting repetitious file transfers, as described more fully below.

It will be appreciated that the satellite communications system 600 may be used to provide different types of communication services to subscribers. For example, the satellite communications system 600 may provide content from the network 620 to a subscriber's CPE 660, including Internet content, broadcast television and radio content, on-demand content, voice-over-Internet-protocol ("VoIP") content, and/ or any other type of desired content. It will be further appreciated that this content may be communicated to subscribers in different ways, including through unicast, multicast, broadcast, and/or other communications.

Embodiments of the invention include methods, systems, and devices that use multicasting, caching, and/or other techniques to provide novel satellite communication functionality. It will be appreciated that other components and systems may be used to provide functionality of the various embodiments described herein. As such, descriptions of various embodiments in the context of components and functionality of FIGS. 6-8 are intended only for clarity, and should not be construed as limiting the scope of the invention.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/ or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for providing peer-to-peer network acceleration, the system comprising:
a plurality of clients in communication together and in communication with at least one content server, wherein each of the plurality of clients is capable of functioning as a proxy server by receiving a peer-to-peer request for content that identifies an associated content server, and by communicating the peer-to-peer request for content to the associated content server;
wherein at least one of the plurality of clients generates a request for content from a content server and the request is part of a chatty communication with a plurality of round trips to complete a response to the request;
wherein the requesting client determines that at least one of the plurality of clients is in a position to retrieve the requested content on the content server at lower latency than the requesting client;
wherein the one of the plurality of clients functions as a proxy server for the requesting client by receiving the request for content from the content server, requesting the content from the content server, and communicating the content as received from the content server to the at least one of the plurality of clients that generates the request for content; and
wherein the requesting client is configured to receive, from the content server via the at least one of the plurality of clients functioning as a proxy server for the requesting client, the requested content.

2. A system for providing peer-to-peer network acceleration as in claim 1, wherein the plurality of clients each include a proxy client running locally on the client machine.

3. A system for providing peer-to-peer network acceleration as in claim 1, wherein the proxy server comprises an acceleration module.

4. A system for providing peer-to-peer network acceleration as in claim 3, wherein the acceleration module is configured to decrease network latency and round trips.

5. A system for providing peer-to-peer network acceleration as in claim 1, wherein the plurality of clients and the plurality of content servers are in communication via a satellite network.

6. A system for providing peer-to-peer network acceleration as in claim 1, wherein the plurality of content servers comprise at least one or more of the following: a mail server, a web server, and a file server.

7. A system for providing peer-to-peer network acceleration as in claim 1, wherein the requesting client is at a first location.

8. A system for providing peer-to-peer network acceleration as in claim 7, wherein the one of the plurality of clients functioning as the proxy server for the requesting client and the content server with the lower latency are at a second location.

9. A system for providing peer-to-peer network acceleration as in claim 8, wherein the first location and the second location are remotely located from each other.

10. A system for providing peer-to-peer network acceleration as in claim 8, wherein either the first location or the second location is a data center.

11. A method of providing peer-to-peer network acceleration, the method comprising:
generating, at a client system, a request for content from a content server, wherein the client system is one of a plurality of client systems and each of the plurality of client systems is capable of functioning as a proxy server by receiving a peer-to-peer request for content that identifies an associated content server, and by communicating the peer-to-peer request for content to the associated content server;
determining that at least one of the plurality of clients is in a position to retrieve the requested content on the content server at lower latency than the requesting client;
selecting at least one of the plurality of client systems to function as a proxy server for the requesting client;

communicating the request for content to the selected at least one of the plurality of clients, wherein the request identifies the content server that is separate from the selected at least one of the plurality of clients and the request is part of a communication with a plurality of round trips between the content server and the selected at least one of the plurality of clients to complete a response to the request; and receiving, from the content server via the at least one of the plurality of clients functioning as a proxy server for the requesting client, the requested content.

12. A method of providing peer-to-peer network acceleration as in claim 11, wherein the plurality of clients each include a proxy client running locally on the client machine.

13. A method of providing peer-to-peer network acceleration as in claim 11, wherein the proxy server comprises an acceleration module.

14. A method of providing peer-to-peer network acceleration as in claim 13, wherein the acceleration module is configured to decrease network latency and round trips.

15. A method of providing peer-to-peer network acceleration as in claim 11, wherein the plurality of clients and the server are in communication via a satellite network.

16. A method of providing peer-to-peer network acceleration as in claim 11, wherein the plurality of content servers comprise at least one or more of the following: a mail server, a web server, and a file server.

17. A method of providing peer-to-peer network acceleration, the method comprising:
   generating, at a first client system, a request for content from a content server, wherein:
      the first client system is one of a plurality of client systems;
      communication links between each of the plurality of client systems are high latency links;
      a first link from the first client system to the content server comprises a high latency link;
      the request is part of a chatty communication with a plurality of round trips to complete a response to the request; and
      each of the plurality of client systems is capable of requesting content on behalf of each of the other client systems;
   determining, in response to the request, that at least one of the plurality of clients is in a position to retrieve the content from the content server at lower latency than the first client;
   selecting a second client of the at least one of the plurality of client systems that is in a position to retrieve the content from the content server at lower latency than the first client to request the content from the content server;
   communicating the request from the first client to the second client; and
   receiving at the first client system, from the content server via the selected at least one of the plurality of clients, the content.

18. The method of claim 1 further comprising:
   receiving, at the second client, the request from the first client for the content;
   receiving, at the second client, the content as part of the communication with a plurality of round trips between the second client and the content server; and
   communicating, from the second client to the first client, the content as part of a single transmission from the second client to the first client.

19. The method of claim 1 further comprising:
   receiving, at the second client, the request from the first client for the content;
   receiving, at the second client, the content as part of a communication with a plurality of round trips between the second client and the content server; and
   communicating, from the second client to the first client, the content using a reduced number of round trips than is used during communication of the content from the content server to the second client.

20. The method of claim 1 wherein the content comprises a web page prefetch or a download file.

* * * * *